United States Patent
Casellas et al.

(10) Patent No.: US 11,332,365 B2
(45) Date of Patent: May 17, 2022

(54) HYDROGEN STORE COMPRISING A COMPOSITE MATERIAL, AND METHOD FOR THE PRODUCTION THEREOF

(71) Applicant: GKN Sinter Metals Engineering GmbH, Radevormwald (DE)

(72) Inventors: Antonio Casellas, Siegburg (DE); Eberhard Ernst, Eichenzell (DE)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 1332 days.

(21) Appl. No.: 15/308,444

(22) PCT Filed: May 4, 2015

(86) PCT No.: PCT/EP2015/059726
§ 371 (c)(1),
(2) Date: Nov. 2, 2016

(87) PCT Pub. No.: WO2015/169754
PCT Pub. Date: Nov. 12, 2015

(65) Prior Publication Data
US 2017/0057817 A1    Mar. 2, 2017

(30) Foreign Application Priority Data
May 5, 2014 (DE) .................. 10 2014 006 370.4

(51) Int. Cl.
*B32B 9/00* (2006.01)
*C01B 3/00* (2006.01)
*B82Y 30/00* (2011.01)

(52) U.S. Cl.
CPC .......... *C01B 3/0078* (2013.01); *C01B 3/0021* (2013.01); *C01B 3/0031* (2013.01); *C01B 3/0084* (2013.01); *B82Y 30/00* (2013.01); *Y02E 60/32* (2013.01); *Y10T 428/30* (2015.01)

(58) Field of Classification Search
CPC ........ Y10T 428/30; C01B 30/04; B82Y 30/00
USPC ......................................... 428/408; 423/448
See application file for complete search history.

(56) References Cited

U.S. PATENT DOCUMENTS

| | | | |
|---|---|---|---|
| 5,185,221 A * | 2/1993 | Rampel | H01M 4/242 429/101 |
| 5,360,461 A | 11/1994 | Meinzer | |
| 6,755,219 B1 | 6/2004 | Bolle | |
| 7,094,276 B2 | 8/2006 | Kojima et al. | |
| 7,186,474 B2 | 3/2007 | Jang | |
| 7,651,554 B2 | 1/2010 | Tan et al. | |
| 2005/0074612 A1* | 4/2005 | Eklund | B22F 1/0018 428/403 |

(Continued)

FOREIGN PATENT DOCUMENTS

| | | |
|---|---|---|
| CN | 101746719 A | 6/2010 |
| CN | 103183314 A | 7/2013 |

(Continued)

OTHER PUBLICATIONS

Shorter Oxford English Dictionary 1539 (6th ed. 2007).*

(Continued)

*Primary Examiner* — Daniel H Miller
(74) *Attorney, Agent, or Firm* — Quarles & Brady LLP (57) ABSTRACT

The present invention concerns a hydrogen store comprising a hydrogenable material, and a method for producing a hydrogen store.

19 Claims, 1 Drawing Sheet

(56) References Cited

U.S. PATENT DOCUMENTS

| | | |
|---|---|---|
| 2006/0237688 A1 | 10/2006 | Zimmerman |
| 2007/0175505 A1 | 8/2007 | Kool |
| 2010/0096595 A1* | 4/2010 | Prud'Homme ........ B82Y 30/00 |
| | | 252/500 |
| 2010/0187468 A1 | 7/2010 | Zimmermann |
| 2011/0297879 A1 | 12/2011 | Jorgensen et al. |
| 2012/0135335 A1 | 5/2012 | Adams et al. |
| 2012/0141369 A1 | 6/2012 | Zimmermann |
| 2012/0141892 A1 | 6/2012 | McLean et al. |
| 2013/0004865 A1 | 1/2013 | Stimits et al. |
| 2013/0220479 A1 | 8/2013 | Luo et al. |
| 2014/0050910 A1* | 2/2014 | Mukherjee .......... H01M 4/0471 |
| | | 428/219 |

FOREIGN PATENT DOCUMENTS

| | | |
|---|---|---|
| DE | 103 39 548 A1 | 3/2005 |
| DE | 10 2011 007 361 A1 | 10/2012 |
| JP | S609839 A | 1/1985 |
| JP | 2001214206 A | 8/2001 |
| JP | 2004-196634 A | 7/2004 |
| JP | 2004-283694 A | 10/2004 |
| JP | 2005280164 A | 10/2005 |
| JP | 2007302523 A | 11/2007 |
| JP | 2008538321 A | 10/2008 |
| WO | 95/05999 A1 | 3/1995 |
| WO | 2008148778 A1 | 12/2008 |

OTHER PUBLICATIONS

PCT International Search Report for corresponding International Application No. PCT/EP2015/059726 dated Aug. 7, 2015.

Jinbao Gao, Carbon Matrix Confined Sodium Alanate for Reversible Hydrogen Storage, University of Utrecht thesis, Nov. 19, 2012, 128 pages, The Netherlands.

S. Sakietuna, et al., International Journal of Energy, 32, dated 2007, p. 1121-1140.

Japan Patent Office, Notice of Reasons for Rejection, Application No. 2016-566654, dated May 7, 2019, 10 pages [English language translation only].

* cited by examiner

HYDROGEN STORE COMPRISING A COMPOSITE MATERIAL, AND METHOD FOR THE PRODUCTION THEREOF

This application represents the U.S. national stage entry of PCT International Application No. PCT/EP2015/059726 filed May 4, 2015, which claims priority to German Patent Application No. 10 2014 006 370.4 filed May 5, 2014, the disclosures of which are incorporated herein by reference in their entirety and for all purposes.

The present invention relates to a hydrogen storage means comprising a hydrogenatable material, and to a process for producing a hydrogen storage means.

One of the major challenges in the 21st century is the provision of alternative energy sources. As is well-known, the resources of fossil energy carriers, such as mineral oil or natural gas, are limited. Hydrogen is an alternative of interest here. Hydrogen ($H_2$) in itself is not an energy source, but first has to be prepared with utilization of other energy sources. By contrast with power generated directly by means of solar energy, for example, hydrogen, however, can be stored and transported. Moreover, hydrogen can be converted back to energy in different ways, for example in a fuel cell or by direct combustion. The only waste product formed is water. However, a disadvantage when working with hydrogen is that it is readily combustible, and mixing with air gives rise to highly explosive hydrogen/oxygen mixtures.

Safe storage for transport or storage as well is thus a great challenge.

The prior art describes different hydrogen storage means. For instance, CN 101746719 A describes sodium-alanate-vanadium-titanium alloys as hydrogen storage materials. Compounds having spongelike structures which can be used as hydrogen storage means are described in CN 103183314 A. JP 2004-196634 A and JP 2004-283694 A disclose particles likewise having hydrogen storage properties.

Storage of hydrogen is executed in various ways. The use of hydrogenatable material for this purpose is known. However, it has now been found that, with use of hydrogenatable material, a change in volume as a result of the hydrogen storage thereof can arise.

A hydrogen storage means is also described in U.S. Pat. No. 7,094,276 B2. In this case, the first hydrogenatable material is a metal alloy and the second material is a porous carbon-containing material. Both materials expand on storage of hydrogen. Typically, hydrogenatable materials on storage of hydrogen have an increase in volume of about 20%. On subsequent release of hydrogen from the hydrogenatable materials, the volume of these materials correspondingly decreases again. During operation of a hydrogen storage means of the conventional type, repeated expansion and contraction of the hydrogenatable material takes place. This repeated contraction and expansion of the hydrogenatable material leads to increased stresses within the hydrogenatable material and also the hydrogen storage means, which destroy the hydrogenatable material and hence reduce the lifetime of the hydrogen storage means.

It is an object of the invention to provide a hydrogen storage means having improved properties over the prior art, especially having a prolonged lifetime.

The object underlying the invention is achieved by a hydrogen storage means having the features of claim 1, and by a process having the features of claim 14. Advantageous features, configurations and developments will be apparent from the description which follows, the figures and also the claims, without restriction of individual features from a configuration thereto. Instead, one or more features from one configuration can be combined with one or more features of another configuration to give further configurations. More particularly, the respective independent claims can also each be combined with one another. Nor should the wording of the independent claims be regarded as a restriction of the subject matter claimed. One or more features of the claim wording can therefore be exchanged or else omitted, but may additionally also be added on. It is also possible to use the features cited with reference to a specific working example in generalized form as well, or likewise to use them in other working examples, especially applications.

The invention relates to a hydrogen storage means with an increased lifetime compared to the prior art, comprising a hydrogenatable material, with the hydrogenatable material intercalated in an expandable material composite for compensation at least for a change in volume, especially an expansion, preferably also a contraction, due to the absorption and release of hydrogen by the hydrogenatable material. The material composite comprises a carrier material as well as the hydrogenatable material.

The term "hydrogen storage means" describes a reservoir vessel in which hydrogen can be stored. This can be done using conventional methods of saving and storage of hydrogen, for example compressed gas storage, such as storage and pressure vessels by compression with compressors, or liquefied gas storage, such as storage in liquefied form by cooling and compression. Further alternative forms of storage of hydrogen are based on solids or liquids, for example metal hydride storage means, such as storage as a chemical compound between hydrogen and a metal or an alloy, or adsorption storage, such as adsorptive storage of hydrogen in highly porous materials. In addition, for storage and transport of hydrogen, there are also possible hydrogen storage means which temporarily bind the hydrogen to organic substances, giving rise to liquid compounds that can be stored at ambient pressure, called "chemically bound hydrogen".

Hydrogen storage means may comprise, for example, metals or metal alloys which react with hydrogen to form hydrides (metal hydrides). This process of hydrogen storage is also referred to as hydrogenation and proceeds with release of heat. It is thus an exothermic reaction. The hydrogen stored in the hydrogenation can be released again in the dehydrogenation. The supply of heat is necessary here, since dehydrogenation is an endothermic reaction. A corresponding hydrogen storage means can thus have two extreme states: 1) the hydrogen storage material is fully laden with hydrogen, the material being completely in the form of its hydride; and 2) the hydrogen storage material does not store any hydrogen, and so the material takes the form of the metal or metal alloy.

In the course of hydrogen storage (hydrogenation), there is a reaction with the metal or the metal alloy, i.e. the hydrogen storage material (hydrogenatable material). The product formed is referred to as metal hydride, even when the reaction is with a metal alloy. The release of hydrogen from the metal hydride is then referred to as dehydrogenation. A cycle refers to a hydrogenation and subsequent dehydrogenation of the hydrogen storage material.

The term "material composite" means here that various different components are used in the material composite, in order to be able to provide an expandable hydrogen composite in which the hydrogenatable material can be arranged. In respect of the properties of the material composite, physical properties and geometry of the components are of significance. In particular, the material composite may comprise a polymer.

If one of the components of the material composite is a polymer, it preferably has elastic properties, in order to enable expandability of the material composite. According to the invention, the polymer may be just one polymer or comprise mixtures of different polymers. Preferably, the corresponding component comprises just one polymer. A corresponding component may be present in the material composite in the hydrogen storage means, for example, in the form of a polymeric matrix or a polymeric layer.

In addition, the material composite may also comprise further components, for example a gas conduction layer, in order that the hydrogen can be conducted to the hydrogenatable material and/or conducted away from the hydrogenatable material and/or a heat conduction means for supply and/or removal of heat in the course of hydrogenation and/or dehydrogenation. The material composite is preferably compressed and remains as a partly compressed structure. However, it is likewise possible that the composite material is virtually fully compressed.

The hydrogenatable material can absorb the hydrogen and, if required, release it again. In a preferred embodiment, the material comprises particulate materials in any 3-dimensional configuration, such as particles, granules, granulates, fibers, preferably cut fibers, flakes and/or other geometries. Granules here should preferably be regarded as such bodies which have, for example, two or more component bodies of the same or different size which may comprise identical materials or else at least two different materials, in which case the component bodies in the form of granulate have been combined by means of granulation. More particularly, the material may also take the form of sheets or powder. In this case, the material does not necessarily have a homogeneous configuration. Instead, the configuration may be regular or irregular. Particles in the context of the present invention are, for example, virtually spherical particles, and likewise particles having an irregular, angular outward shape. The surface may be smooth, but it is also possible that the surface of the material is rough and/or has unevenness and/or depressions and/or elevations. According to the invention, a hydrogen storage means may comprise the material in just one specific 3-dimensional configuration, such that all particles of the material have the same spatial extent. However, it is also possible that a hydrogen storage means comprises the material in different configurations/geometries. By virtue of a multitude of different geometries or configurations of the material, the material can be used in a multitude of different hydrogen storage means.

Preferably, the hydrogenatable material has a bimodal size distribution. In this way, a higher bulk density and hence a higher density of the hydrogenatable material in the hydrogen storage means can be enabled, which increases the hydrogen storage capacity, i.e. the amount of hydrogen which can be stored in the storage means.

According to the invention, the hydrogenatable material may comprise, preferably consist of, at least one hydrogenatable metal and/or at least one hydrogenatable metal alloy.

Other hydrogenatable materials used may be:
alkaline earth metal and alkali metal alanates,
alkaline earth metal and alkali metal borohydrides,
metal-organic frameworks (MOFs) and/or
clathrates,
and, of course, respective combinations of the respective materials.

According to the invention, the material may also include non-hydrogenatable metals or metal alloys.

According to the invention, the hydrogenatable material may comprise a low-temperature hydride and/or a high-temperature hydride. The term "hydride" refers to the hydrogenatable material, irrespective of whether it is in the hydrogenated form or the non-hydrogenated form. Low-temperature hydrides store hydrogen preferably within a temperature range between −55° C. and 180° C., especially between −20° C. and 150° C., particularly between 0° C. and 140° C. High-temperature hydrides store hydrogen preferably within a temperature range of 280° C. upward, especially 300° C. upward. At the temperatures mentioned, the hydrides cannot just store hydrogen but can also release it, i.e. are able to function within these temperature ranges.

Where 'hydrides' are described in this context, this is understood to mean the hydrogenatable material in its hydrogenated form and also in its non-hydrogenated form. According to the invention, in the production of hydrogen storage means, it is possible to use hydrogenatable materials in their hydrogenated or non-hydrogenated form.

With regard to hydrides and their properties, reference is made in the context of the disclosure to tables 1 to 4 in S. Sakietuna et al., International Journal of Energy, 32 (2007), p. 1121-1140.

Hydrogen storage (hydrogenation) can be effected at room temperature. Hydrogenation is an exothermic reaction. The heat of reaction that arises can be removed. By contrast, for the dehydrogenation, energy has to be supplied to the hydride in the form of heat. Dehydrogenation is an endothermic reaction.

For example, it may be the case that a low-temperature hydride is used together with a high-temperature hydride. For instance, in one configuration, it may be the case that, for example, the low-temperature hydride and the high temperature hydride are provided in a mixture in a layer of a second region. It is also possible for these each to be arranged separately in different layers or regions, especially also in different second regions. For example, it may be the case that a first region is arranged between these second regions. In a further configuration, a first region has a mixture of low- and high-temperature hydride distributed in the matrix. It is also possible that different first regions include either a low-temperature hydride or a high-temperature hydride.

Preferably, the hydrogenatable material comprises a metal selected from magnesium, titanium, iron, nickel, manganese, nickel, lanthanum, zirconium, vanadium, chromium, or a mixture of two or more of these metals. The hydrogenatable material may also include a metal alloy comprising at least one of the metals mentioned.

More preferably, the hydrogenatable material (hydrogen storage material) comprises at least one metal alloy capable of storing hydrogen and releasing it again at a temperature of 150° C. or less, especially within a temperature range from −20° C. to 140° C., especially from 0° C. to 100° C. The at least one metal alloy here is preferably selected from an alloy of the $AB_5$ type, the AB type and/or the $AB_2$ type. A and B here each denote different metals, where A and/or B are especially selected from the group comprising magnesium, titanium, iron, nickel, manganese, nickel, lanthanum, zirconium, vanadium and chromium. The indices represent the stoichiometric ratio of the metals in the particular alloy. According to the invention, the alloys here may be doped with extraneous atoms. According to the invention, the doping level may be up to 50 atom %, especially up to 40 atom % or up to 35 atom %, preferably up to 30 atom % or up to 25 atom %, particularly up to 20 atom % or up to 15 atom %, preferably up to 10 atom % or up to 5 atom %, of A and/or B. The doping can be effected, for example, with magnesium, titanium, iron, nickel, manganese, nickel, lanthanum or other lanthanides, zirconium, vanadium and/or chromium. The doping can be effected here with one or more different extraneous atoms. Alloys of the $AB_5$ type are readily activatable, meaning that the conditions needed for activation are similar to those in the operation of the hydrogen storage means. They additionally have a higher ductility than alloys of the AB or $AB_2$ type. Alloys of the $AB_2$ or of the AB type, by contrast, have higher mechanical stability and hardness compared to alloys of the $AB_5$ type. Mention may be made here by way of example of FeTi as an alloy of the AB type, $TiMn_2$ as an alloy of the $AB_2$ type and $LaNi_5$ as an alloy of the $AB_5$ type.

More preferably, the hydrogenatable material (hydrogen storage material) comprises a mixture of at least two hydrogenatable alloys, at least one alloy being of the $AB_5$ type and the second alloy being an alloy of the AB type and/or the $AB_2$ type. The proportion of the alloy of the $AB_5$ type is especially 1% by weight to 50% by weight, especially 2% by weight to 40% by weight, more preferably 5% by weight to 30% by weight and particularly 5% by weight to 20% by weight, based on the total weight of the hydrogenatable material.

The hydrogenatable material (hydrogen storage material) is preferably in particulate form (particles).

The particles especially have a particle size $x_{50}$ of 20 μm to 700 μm, preferably of 25 μm to 500 μm, particularly of 30 μm to 400 μm, especially of 50 μm to 300 μm. $x_{50}$ means that 50% of the particles have a median particle size equal to or less than the value mentioned. The particle size was determined by means of laser diffraction, but can also be effected by sieve analysis, for example. The median particle size in the present case is the particle size based on weight, the particle size based on volume being the same in the present case. What is reported here is the particle size of the hydrogenatable material before it is subjected to hydrogenation for the first time. During the storage of hydrogen, stresses occur within the material, which can lead to a reduction in the $x_{50}$ particle size over several cycles.

It has been found that, surprisingly, materials of this size exhibit particularly good properties in hydrogen storage. In the storage and release of hydrogen, there is expansion (in the course of hydrogenation) or shrinkage (in the course of dehydrogenation) of the material. This change in volume may be up to 30%. As a result, mechanical stresses occur on the particles of the hydrogenatable material, i.e. on the hydrogen storage material. In the course of repeated charging and discharging (hydrogenating and dehydrogenating) with hydrogen, it has been found that the particles breakup. If the hydrogenation material, then, in particular, has a particle size of less than 25 μm, particularly of less than 30 μm and especially of less than 50 μm, a fine powder forms during use, and is no longer able to effectively store hydrogen. Moreover, there can be a change in the distribution of the material in the hydrogen storage means itself. Beds having particles of the material with very small diameters of a few nanometers can collect at the lowest point in the hydrogen storage means. In the case of charging with hydrogen (hydrogenation), high mechanical stresses at the walls of the hydrogen storage means occur at this point because of the expansion of the hydrogen storage material. Through the choice of suitable particle sizes for the material, it is possible to at least partly avoid this. On the other hand, a smaller particle size gives rise to a greater number of contact points where the particles interact with the matrix and adhere therein, such that an improved stability arises therefrom, which cannot be achieved in the case of particles having a size of more than 700 μm, especially of more than 500 μm.

The terms "hydrogenatable material" and "hydrogen storage material" are used synonymously in the present application.

In addition, the hydrogenatable material may take the form of a hydride, for example composed of a metal and a polymer, for example polyamides, polyvinyl acetates, polyethylenes or copolymers thereof.

In addition, one component of the material composite, for example metallic interlayers, may have been produced in a sintering process. In a sintering process, fine-grain ceramic or metallic substances are heated, but the temperatures remain below the melting temperature of the main components, such that the shape of the workpiece is conserved. At the same time, there is generally shrinkage because the particles of the starting material become more densely packed and fill pore spaces. A fundamental distinction is made between solid-phase sintering and liquid-phase sintering, where a melt is also formed. The thermal treatment of sintering converts a fine- or coarse-grain green body formed in a preceding process step, for example by means of extrusion, to a solid workpiece. It is only through the thermal treatment that the sintering product receives its final properties, such as hardness, strength or thermal conductivity, which are required in the respective use.

Preferably, the hydrogenatable material in the hydrogen storage means is at least partly in laminar form, especially with an expansion material arranged between individual layers of the hydrogenatable material and preferably providing higher expansion than the hydrogenatable material.

What the term "layers" means is preferably that a material is, or else two or more materials are, arranged in a lamina and this can be delimited as a lamina from a direct environment. For example, different materials may be poured successively one on top of another in a loose arrangement, such that the adjacent layers are in direct contact. In a preferred configuration, a hydrogenatable layer comprising the hydrogenatable material according to the invention may be arranged directly adjacent to an expandable layer, such that, on absorption of hydrogen and/or release of hydrogen, the expansion of the hydrogenatable material can be compensated for. In a further preferred configuration, the hydrogenatable layer may be arranged directly adjacent to a thermally conductive layer, such that the heat which arises on absorption of hydrogen and/or release of hydrogen occur can be released from the hydrogenatable material directly to the adjacent layer. Two or more layers in this configuration then constitute the material composite of the invention.

Furthermore, the layers preferably each have at least one or more than one of the following primary functions: primary hydrogen storage, primary heat conduction and primary gas conduction. This is understood to mean that the respective layer fulfills at least these as its main task in a region of the composite material. For instance, it is possible that a layer is utilized primarily for hydrogen storage and hence, in accordance with the invention, comprises the hydrogenatable material, but is simultaneously also capable of providing at least a certain thermal conductivity. At the same time, however, at least one other layer is present, which assumes the primary task, for example, of heat conduction, meaning that the greatest amount of heat is dissipated from the compressed material composite via this layer compared to other layers in the hydrogen storage means. In this case, in turn, it is possible to utilize the primarily gas-conducting layer, by means of which, for example, hydrogen (fluid) is passed into the material composite, or else, for example, is conducted out of it. In this case, heat can also be entrained by means of the fluid flowing through.

According to the invention, a heat-conducting layer may comprise at least one heat-conducting metal and/or graphite. The heat-conducting material is to have good thermal conductivity on the one hand, but secondly also a minimum weight, in order to minimize the total weight of the hydrogen storage means. The metal preferably has a thermal conductivity $\lambda$ of 100 W/(m·K) or more, especially of 120 W/(m·K) or more, preferably of 180 W/(m·K) or more, particularly of 200 or more. According to the invention, the heat-conducting metal may also be a metal alloy or a mixture of different metals. The heat-conducting metal is preferably selected from silver, copper, gold, aluminum and mixtures of these metals or alloys comprising these metals. Particular preference is given to silver, since it has a very high thermal conductivity of more than 400 W/(m·K). Preference is likewise given to aluminum, since, as well as the high thermal conductivity of 236 W/(m·K), it has a low density and hence a low weight.

According to the invention, graphite comprises both expanded and unexpanded graphite. Preference is given to using expanded graphite. Alternatively, it is also possible to use carbon nanotubes (single-wall, double-wall or multi-wall), since these likewise have very high thermal conductivity. Because of the high costs of the nanotubes, it is preferable to use expanded graphite or mixtures of expanded graphite and unexpanded graphite. If mixtures are present, based on weight, more unexpanded graphite is used than expanded graphite.

Natural graphite in ground form (unexpanded graphite) has poor adhesion in the composite material and can be processed to give a permanent, stable composite only with difficulty. Therefore, in the case of metal hydride-based hydrogen storage, preference is given to utilizing those graphite qualities that are based on expanded graphite. The latter is produced especially from natural graphite and has a much lower density than unexpanded graphite, but has good adhesion in the composite, such that a stable composite material can be obtained. If, however, exclusively expanded graphite were to be used, the volume of the hydrogen storage means would become too great to be able to operate it economically. Therefore, preference is given to using mixtures of expanded and unexpanded graphite.

If the hydrogen storage means or the composite material is compacted by means of pressing, expanded graphite forms an oriented layer which is able to conduct heat particularly efficiently. The graphite layers (hexagonal planes) in expanded graphite are shifted with respect to one another by the pressure on compression, such that lamellae or layers form. These hexagonal planes of the graphite are then in a transverse arrangement (virtually at right angles with respect to the direction of pressure during an axial pressing operation), such that the hydrogen can then be introduced readily into the composite material and the heat can be conducted outward or inward efficiently. As a result, not just conduction of heat but also conduction of gas or conduction of fluid can be enabled.

Alternatively, the expanded graphite can be processed, for example, by means of calendar rolling to give films. These films are then ground again. The flakes thus obtained can then be used as heat-conducting material. The rolling gives rise to a preferential direction in the carbon lattice here too, as a result of which particularly good onward conduction of heat and fluid is enabled.

Graphite and/or the at least one heat-conducting metal may be arranged in a first region directly adjoining a second layer. According to the invention, the first region comprising the composite material may take the form of a layer. Thus, for example, the first layer may directly adjoin a second layer comprising the composite material. More particularly, the hydrogen storage means comprises a plurality of first and a plurality of second layers arranged in alternation within the hydrogen storage means. It is also possible in accordance with the invention that the hydrogen storage means has a third layer different than the first and second layers, which may be arranged between the first and second layers. However, it is also possible that two first layers are separated by one second layer and, subsequently, two first layers are separated by one third layer. It is thus possible that the third layer directly adjoins the first and/or second layer. As well as the three layers, it is also possible for further layers to be present in hydrogen storage means. In principle, the layers may be arranged in any desired sequence, provided that their respective functions in the corresponding positions are sensible for the operation of the hydrogen storage means.

Preference is given to using graphite as heat-conducting material when a high-temperature hydride is present as hydrogenatable material in the material composite. In the case of low-temperature hydrides, preference is given to a heat-conducting metal, especially aluminum. This combination is preferred especially when the two layers directly adjoin one another. According to the invention, it is possible, for example, that a first layer which constitutes the first region, the material composite of the invention comprising a high-temperature hydride, directly adjoins a second layer comprising graphite. This second layer may then in turn directly adjoin a third layer comprising a heat-conducting metal, which then again adjoins a fourth layer comprising graphite. This fourth layer may then again be adjoined directly by a first layer comprising the material composite. Any desired layer sequences are possible in accordance with the invention. In the context of the present invention, "comprise" means that not only the materials mentioned but also further constituents may be present; preferably, however, "comprise" means "consist of".

Graphite and/or aluminum and/or other heat-conducting metals may take the form of granules, of powder or of a sheet or film. A sheet or film may already constitute a layer in the context of the present invention. However, it is also conceivable that 3-dimensional configurations are present, which form a layer which penetrates at least partly into the layer of the material composite, as a result of which it is possible to enable better removal and supply of heat. In particular, graphite, as well as thermal conductivity, also has good conduction of gas. However, aluminum has the better thermal conductivity compared to graphite.

For conduction of gas, the hydrogen storage means preferably has a porous layer. This may, for example, be a heat conduction layer comprising graphite, as described further up. According to the invention, a porous layer may also be a porous region in which the heat-conducting metal or else the hydrogenatable material is not densely compressed, such that conduction of gas (conduction of fluid) is readily possible.

Preferably, the hydrogenatable material, in a further configuration, is incorporated in a matrix, in which case the matrix provides elasticity, at least within the scope of an expansion of the hydrogenatable material. The term "matrix" describes a constituent of a material composite composed of two or more materials bonded to one another, wherein a first material is embedded in a different second material, the matrix. The matrix may comprise one or more materials. It is likewise possible for a material to be embedded into the matrix, but it is also possible to embed two or more different materials into the matrix. The matrix may have open pores or else closed pores. The matrix is preferably porous. The accommodation of one material by the other material can result, for example, in supplementary material properties otherwise possessed only by each of the individual components, such as thermal conductivity or strength. In respect of the properties of the material composites, physical properties and geometry of the components are important. In particular, size effects often play a role. The bonding is effected, for example, in a cohesive or form-fitting manner or a combination of the two. In this way, for example, fixed positioning of the hydrogenatable material in the matrix can be enabled.

The matrix may, in accordance with the invention, comprise one or more materials. The matrix preferably comprises at least one polymer. The matrix may therefore comprise a polymer or mixtures of two or more polymers. Preferably, the matrix comprises just one polymer. More particularly, the matrix itself may be hydrogen-storing. For example, it is possible to use ethylene (polyethylene, PE). Preference is given to utilizing a titanium-ethylene compound. In a preferred configuration, this may store up to 14% by weight of hydrogen.

The term "polymer" describes a chemical compound composed of chain or branched molecules, called macromolecules, which in turn consist of identical or equivalent units, called the constitutional repeat units. Synthetic polymers are generally plastics.

Through the use of at least one polymer, the matrix can impart good optical, mechanical, thermal and/or chemical properties to the material. For example, the hydrogen storage means, by virtue of the polymer, may have good thermal stability, resistance to the surrounding medium (oxidation resistance, corrosion resistance), good conductivity, good hydrogen absorption and storage capacity or other properties, for example mechanical strength, which would otherwise not be possible without the polymer. It is also possible to use polymers which, for example, do not enable storage of hydrogen but do enable high expansion, for example polyamides or polyvinyl acetates.

According to the invention, the polymer may be a homopolymer or a copolymer. Copolymers are polymers composed of two or more different types of monomer unit. Copolymers consisting of three different monomers are called terpolymers. According to the invention, the polymer, for example, may also comprise a terpolymer.

Preferably, the polymer (homopolymer) has a monomer unit which, as well as carbon and hydrogen, preferably additionally includes at least one heteroatom selected from sulfur, oxygen, nitrogen and phosphorus, such that the polymer obtained, in contrast to polyethylene, for example, is not entirely nonpolar. Preferably, the polymer is a copolymer and/or a terpolymer in which at least one monomer unit, in addition to carbon and hydrogen, additionally includes at least one heteroatom selected from sulfur, oxygen, nitrogen and phosphorus. It is also possible that two or more monomer units have a corresponding heteroatom.

The polymer preferably has adhesive properties with respect to the hydrogen storage material. This means that it adheres well to the hydrogen storage material itself and hence forms a matrix having stable adhesion to the hydrogen storage material even under stresses as occur during the storage of hydrogen.

The adhesive properties of the polymer enable stable penetration of the material into a hydrogen storage means and the positioning of the material at a defined point in the hydrogen storage means over a maximum period of time, i.e. over several cycles of hydrogen storage and hydrogen release. A cycle describes the operation of a single hydrogenation and subsequent dehydrogenation. The hydrogen storage material should preferably be stable over at least 500 cycles, especially over at least 1000 cycles, in order to be able to use the material economically. "Stable" in the context of the present invention means that the amount of hydrogen which can be stored and the rate at which hydrogen is stored, even after 500 or 1000 cycles, corresponds essentially to the values at the start of use of the hydrogen storage means. More particularly, "stable" means that the hydrogenatable material is kept at the position within the hydrogen storage means where it was originally introduced into the storage means.

The hydrogenatable material of the present invention, in a preferred embodiment, is a low-temperature hydrogen storage material. In the course of hydrogen storage, which is an exothermic process, therefore, temperatures of up to 150° C. occur. A polymer which is used for the matrix of a corresponding hydrogen storage material has to be stable at these temperatures. A preferred polymer therefore does not break down up to a temperature of 180° C., especially up to a temperature of 165° C., especially of up to 145° C.

More particularly, the polymer is a polymer having a melting point of 100° C. or more, especially of 105° C. or more, but less than 150° C., especially of less than 140° C., particularly of 135° C. or less. Preferably, the density of the polymer, determined according to ISO 1183 at 20° C., is 0.7 g/cm$^3$ or more, especially 0.8 g/cm$^3$ or more, preferably 0.9 g/cm$^3$ or more, but not more than 1.3 g/cm$^3$, preferably not more than 1.25 g/cm$^3$, especially 1.20 g/cm$^3$ or less. The tensile strength according to ISO 527 is preferably in the range from 10 MPa to 100 MPa, especially in the range from 15 MPa to 90 MPa, more preferably in the range from 15 MPa to 80 MPa. The tensile modulus of elasticity according to ISO 527 is preferably in the range from 50 MPa to 5000 MPa, especially in the range from 55 MPa to 4500 MPa, more preferably in the range from 60 MPa to 4000 MPa. It has been found that, surprisingly, polymers having these mechanical properties are particularly stable and have good processibility. More particularly, they enable stable coherence between the matrix and the hydrogenatable material embedded therein, such that the hydrogenatable material remains for a long period at the same position within the hydrogen storage means over several cycles. This enables a long lifetime of the hydrogen storage means.

More preferably, in the context of the present invention, the polymer is selected from EVA, PMMA, EEAMA and mixtures of these polymers.

EVA (ethyl vinyl acetate) refers to a group of copolymers of ethylene and vinyl acetate having a proportion of vinyl acetate in the range from 2% by weight to 50% by weight. Lower proportions of vinyl acetate lead to the formation of rigid films, whereas higher proportions lead to greater adhesiveness of the polymer. Typical EVAs are solid at room temperature and have tensile elongation of up to 750%. In addition, EVAs are resistant to stress cracking. EVA has the following general formula (I):

(formula (I))

EVA in the context of the present invention preferably has a density of 0.9 g/cm$^3$ to 1.0 g/cm$^3$ (according to ISO 1183). Yield stress according to ISO 527 is especially 4 to 12 MPa, preferably in the range from 5 MPa to 10 MPa, particularly 5 to 8 MPa. Especially suitable are those EVAs which have tensile strengths (according to ISO 527) of more than 12 MPa, especially more than 15 MPa, and less than 50 MPa, especially less than 40 MPa, particularly 25 MPa or less. Elongation at break (according to ISO 527) is especially >30% or >35%, particularly >40% or 45%, preferably >50%. The tensile modulus of elasticity is preferably in the range from 35 MPa to 120 MPa, particularly from 40 MPa to 100 MPa, preferably from 45 MPa to 90 MPa, especially from 50 MPa to 80 MPa. Suitable EVAs are sold, for example, by Axalta Coating Systems LLC under the Coathylene® CB 3547 trade name.

Polymethylmethacrylate (PMMA) is a synthetic transparent thermoplastic polymer having the following general structural formula (II):

(formula (II))

The glass transition temperature, depending on the molar mass, is about 45° C. to 130° C. The softening temperature is preferably 80° C. to 120° C., especially 90° C. to 110° C. The thermoplastic polymer is notable for its resistance to weathering, light and UV radiation.

PMMA in the context of the present invention preferably has a density of 0.9 to 1.5 g/cm$^3$ (according to ISO 1183), especially of 1.0 g/cm$^3$ to 1.25 g/cm$^3$. Especially suitable are those PMMAs which have tensile strengths (according to ISO 527) of more than 30 MPa, preferably of more than 40 MPa, especially more than 50 MPa, and less than 90 MPa, especially less than 85 MPa, particularly of 80 MPa or less. Elongation at break (according to ISO 527) is especially <10%, particularly <8%, preferably <5%. The tensile modulus of elasticity is preferably in the range from 900 MPa to 5000 MPa, preferably from 1200 to 4500 MPa, especially from 2000 MPa to 4000 MPa. Suitable PMMAs are sold, for example, by Ter Hell Plastics GmbH, Bochum, Germany, under the trade name of 7M Plexiglas® pellets.

EEAMA is a terpolymer formed from ethylene, acrylic ester and maleic acid anhydride monomer units. EEAMA has a melting point of about 102° C., depending on the molar mass. It preferably has a relative density at 20° C. (DIN 53217/ISO 2811) of 1.0 g/cm$^3$ or less and 0.85 g/cm$^3$ or more. Suitable EEAMAs are sold, for example, under the Coathylene® TB3580 trade name by Axalta Coating Systems LLC.

It is preferable that the matrix is a polymer having low crystallinity. The crystallinity of the polymer can considerably alter the properties of a material. The properties of a semicrystalline material are determined both by the crystalline and the amorphous regions of the polymer. As a result, there is a certain correlation with composite materials, which are likewise formed from two or more substances. For example, the expansion capacity of the matrix decreases with increasing density.

The matrix may also be present in the form of prepregs. Prepreg is the English abbreviation of "preimpregnated fibers". Prepregs are semifinished textile products preimpregnated with a polymer, which are cured thermally and under pressure for production of components. Suitable polymers are those having a highly viscous but unpolymerized thermoset polymer matrix. The polymers preferred according to the present invention may also take the form of a prepreg.

The fibers present in the prepreg may also be present as a pure unidirectional layer, as a fabric or scrim. The prepregs may, in accordance with the invention, also be comminuted and be processed as flakes or shavings together with the hydrogenatable material to give a composite material.

In one version of the present invention, the polymer may take the form of a liquid which is contacted with the hydrogenatable material. One meaning of "liquid" here is that the polymer is melted. However, the invention also encompasses dissolution of the polymer in a suitable solvent, in which case the solvent is removed again after production of the composite material. However, it is also possible that the polymer takes the form of pellets which are mixed with the hydrogenatable material. As a result of the compaction of the composite material, the polymer softens, so as to form the matrix into which the hydrogenatable material is embedded. If the polymer is used in the form of particles, i.e. of pellets, these preferably have an $x_{50}$ particle size (volume-based particle size) in the range from 30 μm to 60 μm, especially 40 μm to 45 μm. The $x_{90}$ particle size is especially 90 μm or less, preferably 80 μm or less.

In addition, for example, it is possible to utilize, for a matrix, a carbon matrix into which the hydrogenatable material is admitted. For example, the University of Utrecht thesis entitled "Carbon matrix confined sodium alanate for reversible hydrogen storage" by J. Gao, retrievable under http://dspace.library.uu.nl/handle/1874/256764, reveals how for the hydrogenatable material to be used and the matrix can be matched to one another, such that it is possible to operate the hydrogen storage means produced therefrom at relatively low temperatures as well. In the context of the disclosure, reference is made to the content of this publication in this regard.

Further components of the matrix may, for example, be materials for the conduction of heat and/or the conduction of gas. Suitable materials have already been described further up with regard to corresponding layers. For example, the matrix can likewise expand during the expansion of the hydrogenatable material, but to a lesser degree than the hydrogenatable material, shrink or else roughly maintain its size, such that the hydrogenatable material maintains its position in the matrix and hence in the hydrogen storage means.

It is additionally preferable that the matrix has at least approximately identical expansion characteristics to the hydrogenatable material. In this way, it can be ensured that the matrix likewise expands or shrinks in the event of expansion or shrinkage of the hydrogenatable material.

The matrix can additionally enable local positioning of the hydrogenatable material. Alternatively, the hydrogenatable material can be fixed in its position by virtue of the material composite being introduced into pockets or pouches which can be fixed at a particular position in the hydrogen storage means.

In addition, the material composite may have one or more buffers, i.e. compressible elastic components which are preferably gas-permeable and heat-conducting, but can in particular be compressed in the event of expansion of the hydrogenatable material. Preferably, the hydrogen storage means has at least one or more than one buffer. These may preferably adjoin the outside of a material composite.

The material composite has an expansion matched to the hydrogenatable material, such that the latter can expand or contract in the event of absorption or release of hydrogen, without destruction of the material composite. For example, the hydrogenatable material in the form of an FeTi alloy, in one configuration, has an expansion of not more than 20%. By contrast, the hydrogenatable material in the form of a magnesium alloy, in another configuration, has an expansion of only 5% at most. It follows from this that different expansion properties are also required, which can be established by means of the material composite.

For example, it is envisaged that at least one component of the material composite has such properties as to permit an expansion at least to the extent to which the hydrogenatable material undergoes a change in volume. For example, a high porosity, just like elastic material properties, may at least partly compensate for any expansion that occurs. The expansion may be a permanent expansion, for example in the event of exceedance of a yield point of the material. More particularly, it may also be the case that the hydrogenatable material is harder than an adjacent layer or matrix material that surrounds the hydrogenatable material. For example, the hydrogenatable material, in the event of an increase in volume, may also at least partly penetrate into the surrounding layer or matrix material and in so doing bring about at least some of the expansion within the layer or matrix material. Preferably, the layer or matrix material surrounding the hydrogenatable material, however, has a displacement effect manifested in an expansion. One configuration envisages that the material composite around the hydrogenatable material absorbs the expansion and transmits it to further-removed layers or matrices. Preferably, these are joined to one another at least in an expandable manner. Another configuration envisages that a layer or matrix which provides compensation for an expansion is provided, for example in the form of elastic material characteristics.

In one configuration, the expansion of the material composite can be influenced by arranging the hydrogenatable material so as to be directed in one spatial direction. Thus, an alignment of the hydrogenatable material can achieve the effect that, in relation to a first axis, the composite material undergoes higher expansion in the direction of a second axis at right angles thereto. These controlled expansion characteristics can be promoted, for example, by virtue of the hydrogenatable material used having a geometry which, in terms of the change in its volume, has a main direction of expansion. This is created, for example, by means of an elongated geometry of a particle, a granule, a flake or another similar geometry. Elongated geometry means that the material comprises particles having an aspect ratio of $\geq 1$, especially of $\geq 2$ and more preferably of $\geq 5$, preferably in turn of $\geq 10$. Another geometry again, especially spherical geometries, of the hydrogenatable material with aspect ratio of nearly 1 are used when uniform expansion in all directions is the aim. In this case, it has been found to be advantageous when different geometries of one or more hydrogenatable materials are either mixed or else are used in different matrices or layers. The effect of this is that, for example, there are different degrees of expansion within the material composite, especially also expansion into other materials, meaning that expansion not just in the outward direction but also into the interior of the material composite is enabled. In a preferred embodiment, for example, in the hydrogen storage means, an opposing pressure is exerted on the material composite when it wants to expand, for example by means of a fixed or yielding area. In this way, a portion of the expansion inward can be accommodated by layers or matrices of the material composite that are designed so as to be expandable, especially flexible, preferably elastic, for the purpose.

In addition, it has been found that a different particle size and an assembly of mixtures comprising deliberately larger and smaller particle sizes can likewise affect the expansion characteristics such that at least some of the expansion can be absorbed within the material composite. However, the same applies not just in the case of particles but also in the case of granules, flakes and other geometries.

It has also been found to be advantageous when the hydrogenatable material is fixed in a localized manner. The fixing serves firstly for directed expansion and also shrinkage. Secondly, it is possible in this way to avoid separation of beds of material that can otherwise occur because of the movement composed of expansion and shrinkage. Local positioning can be provided, for example, via the matrix into which the hydrogenatable material is embedded. This can also be effected by means of appropriate material laminas into which the hydrogenatable material, for example, is incorporated. This can be effected, for example, by means of pockets in which the hydrogenatable material is arranged. Suitable vessels preferably consist of a hydrogen-permeable material. However, it is also possible that a container has gas apertures in order to enable exchange of hydrogen. In addition, the material composite may have one or more buffers, i.e. compressible elastic components which are preferably gas-permeable and heat-conducting, but in particular can be compressed in the event of expansion of the hydrogenatable material. It remains the case, in one configuration, that at least the hydrogen storage means has at least one or more than one buffer. These buffers may preferably adjoin the outside of a material composite.

It is preferable that the material composite is activatable, preferably stretchable, for generation of an elastic property of the expandable material composite, preferably by means of shearing in the event of compression of the material composite. For example, the material composite comprises a polymer and activation can be effected in situ in the event of compression, in which case the compression forces are transmitted radially via the shear in the compact, such that a sliding and/or shearing effect acts on the material composite. The pressing operation can be effected, for example, by means of a press mold having an upper ram and lower ram. In addition, the compression can be effected by means of an isostatic press. The isostatic press method is based on the physical law that the pressure in liquids and gases propagates uniformly in all directions and generates forces on the areas subjected thereto that are directly proportional to these areas. The expandable material composite with the intercalated hydrogenatable material can be introduced into the pressure vessel of a pressing system, for example, in a rubber mold. The pressure that acts on the rubber mold on all sides via the liquid in the pressure vessel compresses the enclosed expandable material composite with the intercalated hydrogenatable material in a uniform manner. The stretching then occurs here microscopically between the powder particles.

In a preferred embodiment, the material composite comprises, at least in part, an elastic component. The elastic component may, for example, be a polymer.

Preferably, at least in the region of an end face of a vessel arranged on the inside of the hydrogen storage means, an elastic material is arranged so as to give rise to elasticity that compensates for a change in length of the hydrogen storage means. The elasticity can be brought about, for example, by a liquid which, on expansion of the hydrogenatable material in the hydrogen storage means, is forced into a tank outside the hydrogen storage means and, in the event of shrinkage of the hydrogenatable material, flows back into the hydrogen storage means. In addition, the elasticity can also be brought about by means of a plate which is secured by means of a spring system to the hydrogen storage means. If the hydrogenatable material in the hydrogen storage means expands, the plate is compressed by the hydrogenatable material such that the springs on which the plate is secured are compressed. If the hydrogenatable material contracts, the springs relax, such that the plate assumes its original position again. In addition, intermediate positions are also possible, according to the extent to which the hydrogenatable material expands. A further example of elasticity may also be an expandable material which is compressed by the expansion of the hybrid material and expands again in the event of shrinkage of the hybrid material.

It is preferable that the material composite has a porosity which decreases from the inside outward.

In addition, the invention relates to a process for producing a hydrogen storage means, having the following steps:
providing a hydrogenatable material,
providing a component
contacting the component with the hydrogenatable material to form an expandable material composite, preferably one having an elastic property. According to the invention, the material composite may also have a carrier material, for example porous metal structures or polymer sponges.

It is preferable that the material composite is stretched before it is inserted into a vessel of the hydrogen storage means. In this way, it is possible to ensure that the material composite is immediately ready for use after insertion into the vessel of the hydrogen storage means.

In a preferred embodiment, by means of stretching, an elastic property of the material composite is activated. More particularly, during a pressing operation of the material composite, the polymer in the material composite can be stretched, which activates an elastic property of the material composite. The pressing operation can be effected by means of a press mold having an upper ram and lower ram. In addition, the compression can be effected by means of isostatic pressing. The isostatic press method is based on the physical law that the pressure in liquids and gases propagates uniformly in all directions and generates forces on the areas subjected thereto that are directly proportional to these areas. The expandable material composite with the intercalated hydrogenatable material can be introduced into the pressure vessel of a pressing system, for example, in a rubber mold. The pressure that acts on the rubber mold on all sides via the liquid in the pressure vessel compresses the enclosed expandable material composite with the intercalated hydrogenatable material in a uniform manner.

It is possible that the hydrogenatable material is first hydrogenated and then a polymer which is hydrogen-permeable is added thereto. In this way, a coating can be provided, which is hydrogen-permeable and provides the hydrogenatable material with further properties. In addition, the coating can protect the hydrogenatable material from oxidation and, for example, improve the thermal conductivity, such that the heat which arises in the hydrogenation and/or dehydrogenation can be dissipated. In addition, the polymer can expand and/or shrink together with the hydrogenatable material in the course of hydrogenation and/or dehydrogenation, or the polymer leaves space for expansion of the hydrogenatable material.

It is preferable that the polymer creates a matrix in which the material is embedded, preferably a matrix in the form of closed porosities. In this way, it is possible to avoid direct contact with the surrounding medium.

In a preferred configuration, for creation of the material composite, at least one carbon is added, preferably a naturally expanded graphite and/or an unexpanded graphite. By addition of the carbon, it is possible to improve the thermal conductivity, it is also possible to utilize the expanded natural graphite in particular as a matrix not just for the hydrogenatable material but also for a heat-conducting material, for example an unexpanded graphite. Preference is given to using lower percentages by weight of expanded natural graphite together with higher percentages by weight of an unexpanded graphite.

Further advantageous configurations and also features are apparent from the figures which follow and the corresponding description. The individual features that are apparent from the figures and the description are merely illustrative and not restricted to the particular configuration. Instead, one or more features from one or more figures can be combined with other features from other figures and also from the above description to give further configurations. Therefore, the features are specified not in a restrictive manner but merely by way of example.

The figures show.

Figure 1:
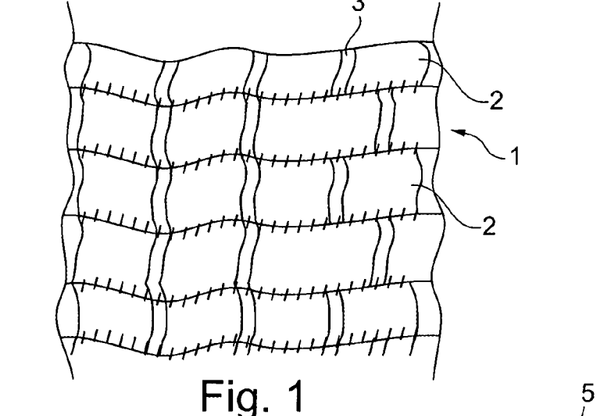
FIG. 1 a detail from a hydrogen storage means.

FIG. 1 shows a detail from a hydrogen storage means 1 having various layers 2 associated with one another in a material composite. The layers 2 themselves in turn have, for example, divisions 3, for example gaps. The divisions preferably serve to accommodate expansion which, in this way, is accommodated in the material composite itself. For example, a layer may bend and may possibly move slightly, but remains within the compressed material composite. The dashes 4 between the individual layers 2 indicate that, as described above, expansions, for example, especially elastic deformations are enabled there through an appropriate choice of material, for example.

Figure 2:
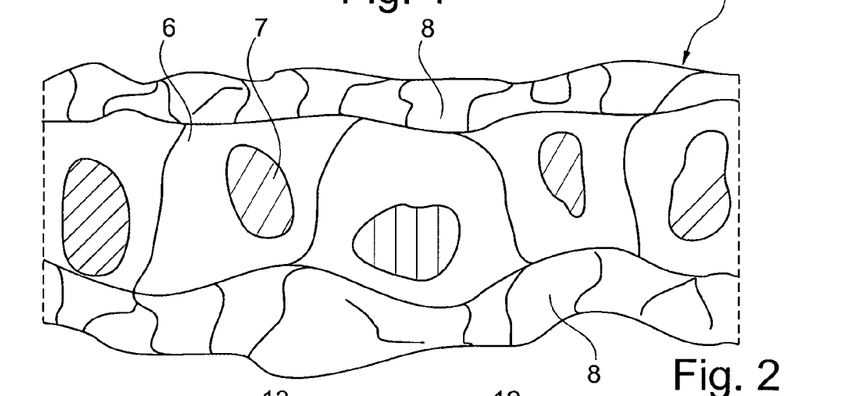
FIG. 2 a matrix with adjoining elastic, preferably porous layer, and
FIG. 3 a further configuration of a hydrogen storage means with buffers at the ends of a material composite.

FIG. 2 shows, by way of example, a matrix 5 with hydrogenatable material 7 embedded in pores 6. The hydrogenatable material 7 is shown, by way of example, in particle form. In one configuration, the hydrogenatable material 7 is embedded into the matrix in a hydrogenated state or is surrounded, for example, by a polymer. In this way, it has, for example, its maximum expansion at this time and, in the course of the subsequent operation in the hydrogen storage means, some of the expansion by the compressed material composite is already accommodated because of the first expansion in volume. Preferably, the matrix 5 has, at least on one side, preferably on both sides, an elastic layer 8. The hydrogenatable material 7 or the matrix 5 can expand into this.

Figure 3:
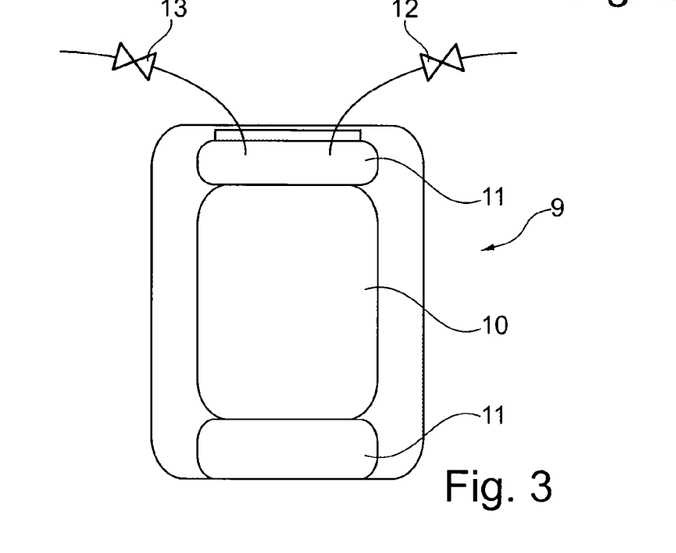

FIG. 3 shows, by way of example, a configuration of a further, second hydrogen storage means 9. The second hydrogen storage means 9 comprises a compressed material composite 10 cushioned at each end by a buffer 11. The buffer may, for example, be fluid-filled, especially liquid-filled. If the material composite expands in terms of its outside geometry, the buffer can compensate for this expansion, for example by virtue of the fluid flowing away. If, by contrast, the material composite shrinks, this change in volume can be balanced out by addition of fluid. This is indicated in each case by the first valve 12 and second valve 13. In addition, however, it is likewise also possible for the fluid to be redistributed in the vessel. In this way, it is possible to dispense with external conduits. Thus, not only an expandable material composite but also a buffered material composite in the hydrogen storage means is provided.

The present invention therefore relates to a hydrogen storage means comprising a hydrogenatable material, with the hydrogenatable material intercalated in an expandable material composite for compensation at least for a change in volume, especially an expansion, preferably also a contraction, due to the absorption and release of hydrogen by the hydrogenatable material.

Preferably, the material composite is activatable, preferably stretchable, for generation of an elastic property of the expandable material composite, preferably by means of shearing in the event of compression of the material composite.

More particularly, the hydrogenatable material is at least partly in laminar form, with an expansion material arranged between individual layers of the hydrogenatable material and preferably providing higher expansion than the hydrogenatable material.

The hydrogenatable material can be incorporated in a matrix, in which case the matrix provides elasticity, at least within the scope of an expansion of the hydrogenatable material. The matrix preferably has at least approximately identical expansion characteristics to the hydrogenatable material. The material composite especially comprises, at least in part, an elastic material.

Preferably, at least in the region of an end face of a vessel arranged on the inside of the hydrogen storage means, an elasticity is arranged so as to compensate for a change in length of the hydrogen storage means.

The material composite may have a porosity which decreases from the inside outward.

In a further embodiment, the object underlying the present invention is achieved by a process for producing a hydrogen storage means having the following steps:
providing a hydrogenatable material,
preparing a carrier material and
supplying hydrogenatable material and carrier material and using them to create an expandable material composite, preferably one having an elastic property.

The material composite is especially stretched before it is inserted into a vessel of the hydrogen storage means, for activation of an elastic property of at least part of the material composite. More particularly, by means of stretching, an elastic property of the material composite is activated.

Preferably, the hydrogenatable material is hydrogenated and then a polymer which is hydrogen-permeable is added thereto.

More particularly, the polymer creates a matrix in which the material is embedded, preferably a matrix in the form of closed porosities. Preferably, for creation of the material composite, at least one carbon is added, preferably a naturally expanded graphite and an unexpanded graphite.

Preferably, the hydrogenatable material is provided with a coating for protection from oxidation, preferably with partial bonding of the coating to the carrier material and hence fixing of the hydrogenatable material.

Preferably, the hydrogenatable material has a partial or complete coating of the surface. The coating may comprise a polymer which may be the same as the component in the material composite. However, it is also possible to use different polymers.

The invention claimed is:

1. A hydrogen storage means comprising a hydrogenatable material, with the hydrogenatable material intercalated in an expandable material composite comprising at least one component for compensation at least for an expansion in volume due to the absorption or release of hydrogen by the hydrogenatable material wherein the hydrogenatable material is at least partly in laminar form, with an expansion material arranged between individual layers of the hydrogenatable material as a component providing higher expansion than the hydrogenatable material such that the hydrogenatable material can expand or contract in the event of absorption or release of hydrogen without destruction of the material composite.

2. The hydrogen storage means as claimed in claim 1, wherein the material composite is activatable for generation of an elastic property of the expandable material composite.

3. The hydrogen storage means as claimed in claim 1, wherein the hydrogenatable material is incorporated in a matrix, in which case the matrix provides elasticity, at least within the scope of an expansion of the hydrogenatable material.

4. The hydrogen storage means as claimed in claim 1, wherein the at least one component comprises at least one polymer.

5. The hydrogen storage means as claimed in claim 4, wherein the polymer includes one or more polymers selected from the group comprising EVA, PMMA and EEAMA.

6. The hydrogen storage means as claimed in claim 1, wherein the material composite further comprises graphite.

7. The hydrogen storage means as claimed in claim 1, comprising a first layer and at least one second layer, the first layer comprising the material composite.

8. The hydrogen storage means as claimed in claim 7, wherein the second layer includes a material for conduction of heat and/or a material for conduction of gas.

9. The hydrogen storage means as claimed in claim 7, wherein the second layer includes graphite and/or aluminum.

10. The hydrogen storage means as claimed in claim 1, wherein the material composite has a porosity which decreases from the inside outward.

11. A process for producing a hydrogen storage means as claimed in claim 1, having the following steps:
providing a hydrogenatable material,
providing a component and
contacting hydrogenatable material and component to produce an expandable material composite.

12. The process as claimed in claim 11, wherein the material composite is stretched before it is inserted into a vessel of the hydrogen storage means, for activation of an elastic property of at least part of the material composite.

13. The process as claimed in claim 11, wherein by means of stretching, an elastic property of the material composite is activated.

14. The process as claimed in claim 11, wherein the hydrogenatable material is hydrogenated and then a polymer which is hydrogen-permeable is added thereto.

15. The process as claimed in claim 14, wherein the polymer creates a matrix in which the material is embedded.

16. The process as claimed in claim 11, wherein for creation of the material composite, at least one carbon is added.

17. The process as claimed in claim 11, wherein the hydrogenatable material is provided with a coating for protection from oxidation.

18. The hydrogen storage means as claimed in claim 2, wherein the composite material is stretchable for generation of the elastic property of the expandable material composite by means of shearing in the event of compression of the material composite.

19. The process as claimed in claim 11, wherein the expandable material composite is elastic.

\* \* \* \* \*